US005917817A

United States Patent [19]
Dunn et al.

[11] Patent Number: 5,917,817
[45] Date of Patent: Jun. 29, 1999

[54] USER INVOCATION OF SERVICES IN PUBLIC SWITCHED TELEPHONE NETWORK VIA PARALLEL DATA NETWORKS

[75] Inventors: James M. Dunn, Ocean Ridge, Fla.; Alan George Ganek, Chappaqua, N.Y.; Colin George Harrison, Brookfield, Conn.; Edith Helen Stern, Boca Raton, Fla.; Barry Edward Willner, Briarcliff Manor, N.Y.

[73] Assignee: International Business Machines Corporation, Armonk, N.Y.

[21] Appl. No.: 08/761,257

[22] Filed: Dec. 6, 1996

[51] Int. Cl.[6] .................................................. H04M 3/42
[52] U.S. Cl. .......................... 370/352; 370/410; 370/522
[58] Field of Search .................................. 370/352, 354, 370/356, 400, 401, 522, 410; 379/210, 212, 215, 230; 395/186, 187.01, 188.01

[56] References Cited

U.S. PATENT DOCUMENTS

| | | |
|---|---|---|
| 5,673,322 | 9/1997 | Pepe et al. |
| 5,802,320 | 9/1998 | Baehr et al. |
| 5,805,587 | 9/1998 | Norris et al. |
| 5,812,640 | 9/1998 | Chawla et al. |
| 5,818,919 | 10/1998 | Berberich, Jr. et al. |
| 5,832,506 | 11/1998 | Kuzma . |
| 5,838,682 | 11/1998 | Dekelbaum et al. |
| 5,838,768 | 11/1998 | Sumar et al. |

*Primary Examiner*—Chau Nguyen
*Assistant Examiner*—Eva Tang
*Attorney, Agent, or Firm*—Richard A. Tomlin; Robert Lieber

[57] ABSTRACT

This invention allows customers and other users of the Public Switched Telephone Network (PSTN) to enable, disable or modify special services provided by the network. The PSTN is defined here as all equipment world wide (land-based, radio or other) enabling ordinary telephone users to connect to other telephone users, but excludes private telephone networks such as "tie line" systems maintained or leased by private enterprises. Presently contemplated actions can be taken independent of the state of the customer's telephone line (e.g. on-hook or off-hook), and usually involve use of equipment other than telephones and communication networks other than the PSTN (e.g. computers operating through the Internet and pagers operating through pager networks). The special services include existing services (call waiting, call blocking, call forwarding, etc.) and new ones (e.g. transferring an active call from a desk phone to a mobile cellular one without interrupting the call). Security firewalls, between the public and telephony application intelligence (TAI) systems that administer customer services within the PSTN, ensure that actions by unauthorized individuals do not interfere with or adversely affect telephone system operations. Authorized customers taking presently contemplated actions will not be able to adversely affect telephone system operations. The present system will work on information maintained at any level of an intelligent network hierarchy within the PSTN, including service nodes through which customer services are traditionally provided.

8 Claims, 8 Drawing Sheets

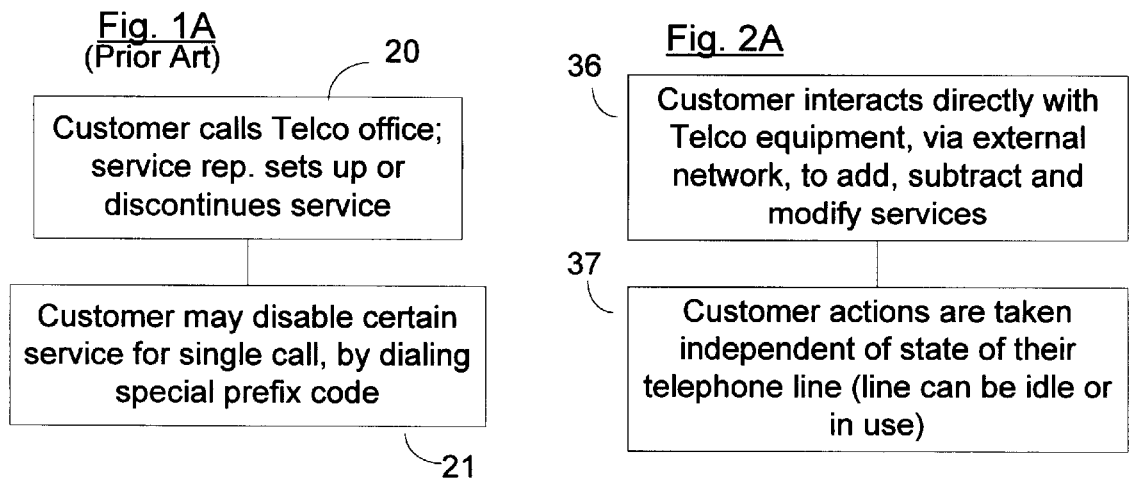
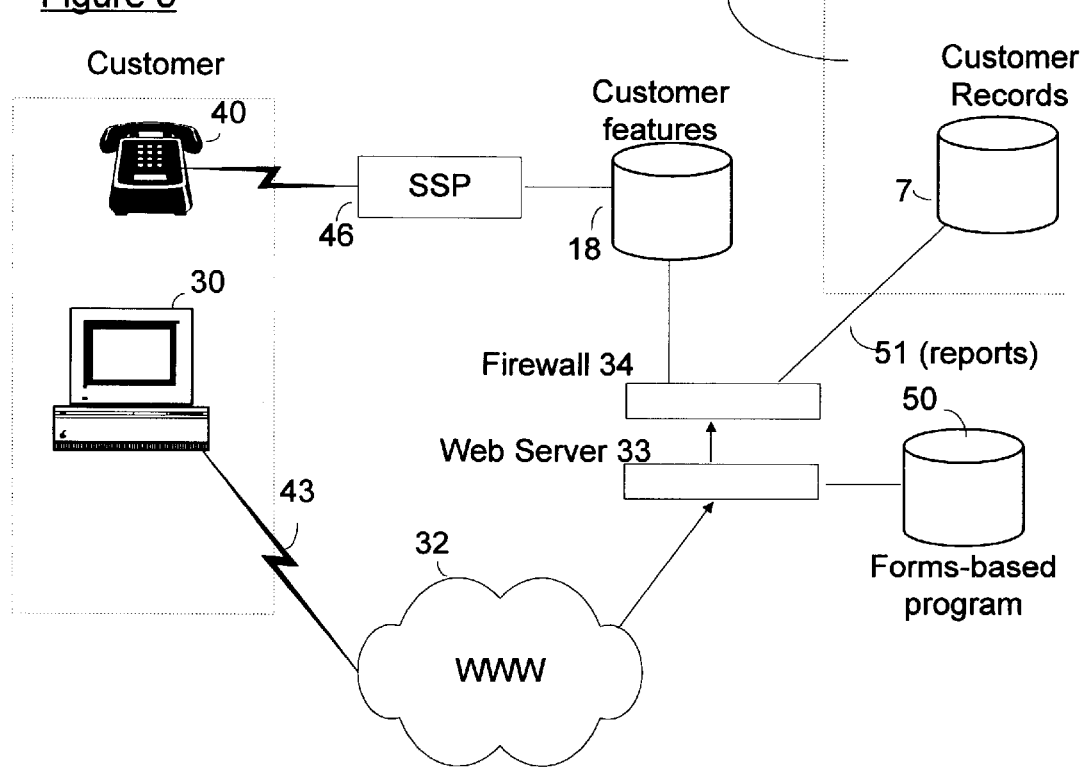

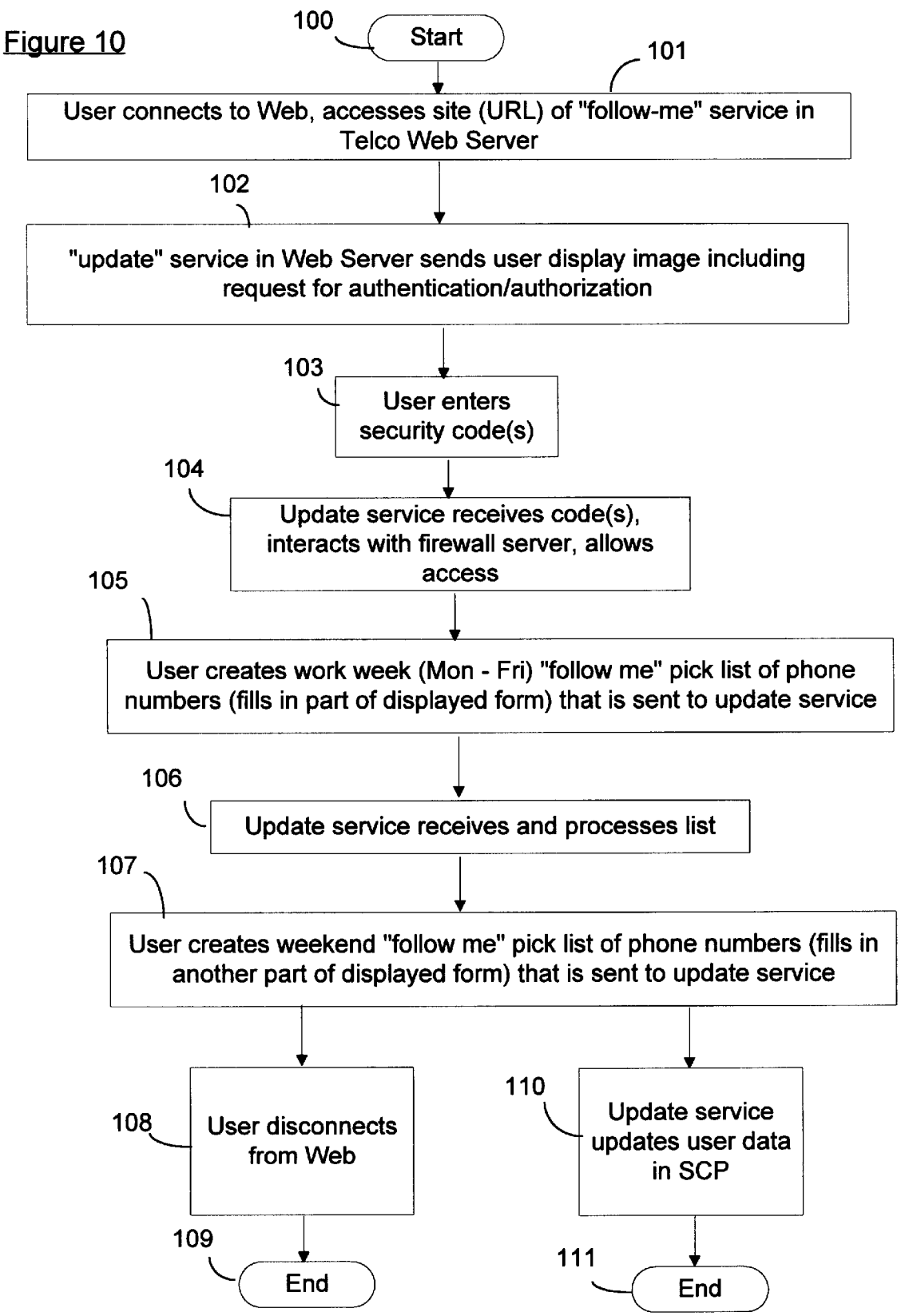

USER INVOCATION OF SERVICES IN PUBLIC SWITCHED TELEPHONE NETWORK VIA PARALLEL DATA NETWORKS

CROSS-REFERENCES TO RELATED APPLICATIONS

Application Ser. No. 08/761,249 by J. M. Dunn et al, filed on the same date as this application and entitled Multimedia Conferencing Using Parallel Networks, describes linkage of data networks to conference management facilities of the public switched telephone network (PSTN); allowing for participants in telephone conferences to invoke special telephone services during the conference, by means of signals sent over a data network, as well as to have image data (charts, etc.) distributed in coordination with voice presentations.

Application Ser. No. 08/751,091 by M. A. Block et al, filed Nov. 15, 1996 and entitled Cross Service Common User Image Association, discloses a system that permits users of multiple networks/domains to employ common name identities across all or some of the domains.

BACKGROUND OF THE INVENTION

Global telephone services today are provided through a Public Switched Telephone Network (hereafter, PSTN). As viewed presently, the PSTN is the aggregate of all lines and equipment serving to connect users of telephones (land-based, radio and other), but excludes private networks formed from leased telephone lines and public data networks like the Internet and/or World Wide Web (hereafter also referred to as the Web).

Certain services available to customers and other users of the PSTN—e.g. call waiting, call forwarding, call blocking, etc.—are generally in either an enabled or disabled state while individual subscriber telephones are idle (on hook), and may be set to the reverse state by the user as part of the call dialing (or tone keying) process. For instance, call waiting can be set from enabled to disabled by entry of "*70" as a prefix to a called area code and telephone number. The entry may be performed either by telephone users or private equipment intermediate telephone company lines and telephone users (e.g. a PBX or a computer and modem interfacing to a telephone company line).

Procedures allowed by telephone companies for such controlling actions (by or in behalf of their customers) tend to unduly restrict times at which these actions can be performed (usually to the time of call-out dialing/tone keying), as well as to unduly limit the types of functions that can be controlled. For example, a telephone user having a centralized voice mail service might want to have specific messages replayed out of sequence; e.g. only the 7th and 8th messages in a series of say 10 recorded messages. However, it might be unfeasible for telephone companies to offer such facilities where operator intervention is unavailable or too costly, since the function might require so many actions by customers as to make that type of service unwieldy or impractical.

Furthermore, in respect to some services the user might have need to be able to disable them automatically for long periods of time (hours or days), rather than for single calls, or even to be able to disable them while a call connection is active. Such activities are generally unfeasible or impractical for use in today's PSTN infrastructure.

The present invention seeks to overcome limitations of today's PSTN infrastructure, and provide a cost-effective and simple system and method for enabling the PSTN to allow its customers and their agents (authorized users) to control (add, alter and remove) a wide variety of services at any time (before calls, during call dial-out, and while call connections are active). It also seeks to allow the PSTN to permit its customers and their agents to place highly sophisticated restrictions on their controlling actions (e.g. to be able to specify disablement of a given service for a precise number of minutes, hours or days, etc.).

SUMMARY OF THE INVENTION

Our proposed solution is to restructure call management resources of the PSTN, whether centralized or distributed, so as to allow for PSTN users to communicate with such call management resources, without assistance of telephone company operators, through networks external to the PSTN—e.g. data communication networks such as the Internet or World Wide Web (hereafter, the Web or WWW)—and facilities within the PSTN appropriately adapted for such communications (altered existing facilities and/or new ones).

Thus, customers of the PSTN and their authorized agents could carry out sophisticated communications with PSTN facilities configured in accordance with this invention, for evoking or administering actions that in today's PSTN infrastructure would be either unfeasible or impractical. As implied above, such actions could include (but would not be restricted to) actions enabling end users to disable or re-activate existing functions like call waiting and call forwarding at any time (while their telephone is idle or actively connected in a call), and to have the disablement or reactivation apply to more than one call, or even to have an active call connection switched without interrupting the call (i.e. in a manner enabling parties to the call to continue conversing without hiatus). The last-mentioned function could for instance allow a user to easily continue a call (e.g. an important business call) started at home or in the office, while switching from a desk phone to a mobile cellular unit or from a mobile unit to a desk phone.

Another important facet of the present invention is that it would enable the PSTN to support a wide variety of customer equipment operating to communicate through diverse networks (the Internet, pager networks, etc.).

Another important aspect of presently contemplated modifications to call management resources of the PSTN is the proposed inclusion of security firewalls between such resources and PSTN points of customer access, such security firewalls ensuring that actions by unauthorized individuals do not impair operations of the PSTN.

Another beneficial aspect is the presently contemplated structuring of the form of interaction permitted between customers and PSTN offices such that actions by customers and their authorized agents or telephone users are unable to adversely affect PSTN operations in respect to other customers.

Our invention further contemplates use of diverse communication devices in addition to telephones and computers for sustaining new service features presently contemplated. For instance in one described application a signal sent from the PSTN to a PSTN customer having a 2-way pager, followed by an acknowledgement from the customer's pager, serves as a key to the user's selection of a choice from a list of options previously furnished by the user (for example, a "follow me" list of numbers to which the users calls are to be forwarded).

These and other physical and logical elements of the present invention will also become evident as this description proceeds.

BRIEF DESCRIPTION OF THE DRAWINGS

FIG. 1A is a chart indicating how the system of FIG. 1 is used today by PSTN customers.

FIG. 2A is a chart indicating how the arrangement of FIG. 2 would be used by PSTN customers.

FIG. 5 illustrates an alternative to the configuration suggested in FIG. 4.

FIGS. 9 and 10 are flow diagrams indicating how a PSTN customer having a two-way pager and web access could use the arrangement of FIG. 8. FIG. 9 shows how the user control service activation through their pager. FIG. 10 shows how the user sets up pick list schedules prior to actions of FIG. 9 as the basis for selections made in FIG. 9.

DETAILED DESCRIPTION

Figure 1:
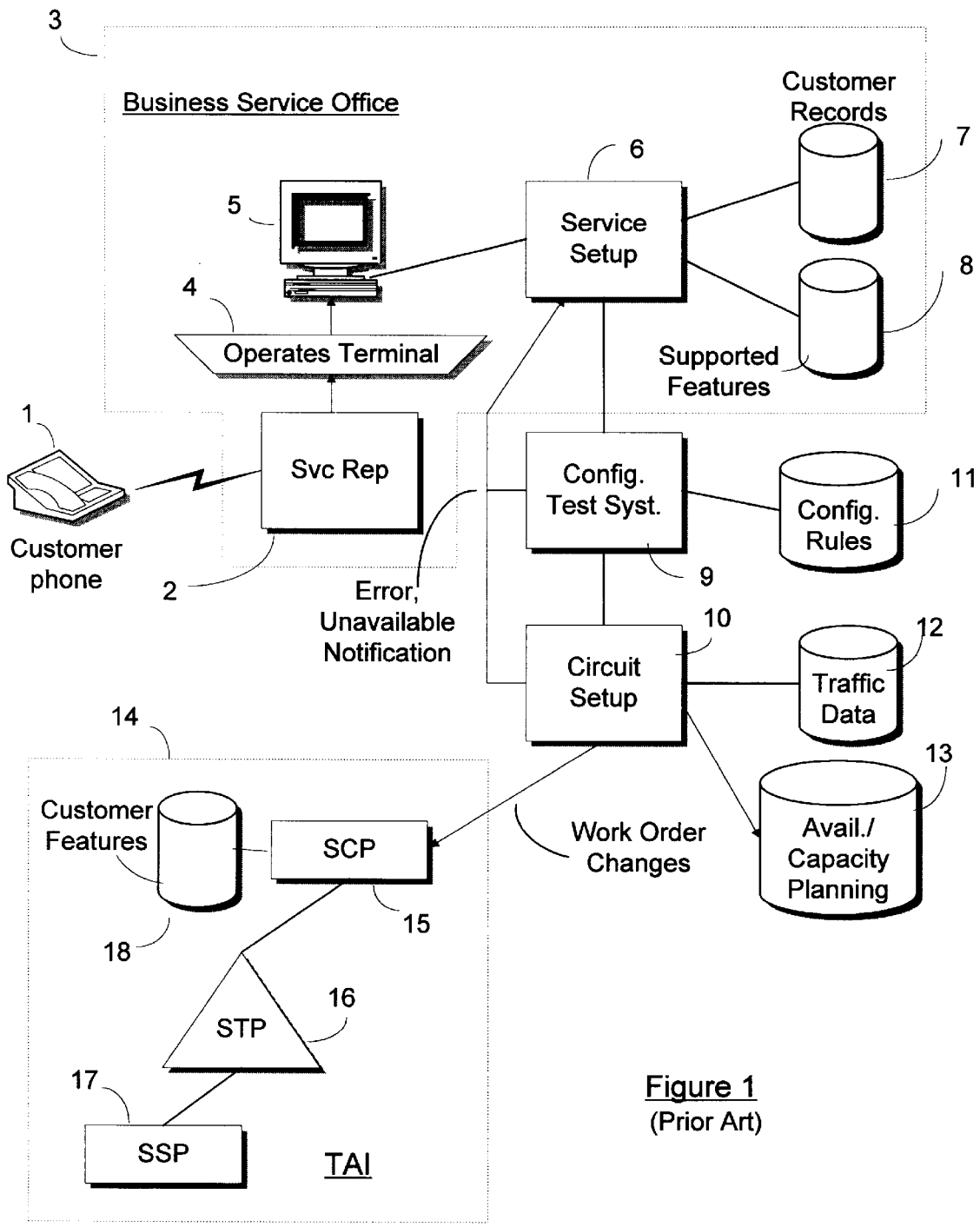
FIG. 1 schematically illustrates the existing (prior art) service management infrastructure of the PSTN.

FIG. 1 illustrates how customer services are administered today in the PSTN. To sign up for a service, the customer uses his/her phone 1 to connect to a service representative 2 at a telephone company business office 3. The customer requests the desired service and the representative performs operations 4, at a computer terminal 5, to establish the desired service and company records supporting it. For establishing the service and associated administrative records, the computer terminal communicates through a local "service setup" interface 6 to databases 7 and 8 respectively containing (local) customer records and (locally) supported features or services. After determining that the desired service or feature is locally available, further communications are conducted through a configuration testing system 9 and circuit setup system 10, either or both of which may be outside of and even remote from the office 3.

The configuration test system 9 interacts with a "configuration rules" database 11 to determine if the circuit configuration required for the desired feature is permissible. Circuit setup system 10 interfaces with databases 12 and 13, respectively containing information on traffic and (availability/capacity) planning, to determine if the requested service or feature can be provided over the existing local PSTN infrastructure. If the feature can be provided, a work order designating the requested service (and customer identity, etc.) is handed over to a "telephony application intelligence" (TAI) system 14 which performs all of the activities required to provide the requested service or feature to the requesting customer. TAI system 14 typically has a hierarchical construction of three processing components 15–17 which may be either concentrated or distributed (physically and/or geographically).

Processing component 15, designated Service Control Point (SCP), maintains a database 18 of customer features which may for instance include customer-specified "pick lists" that are to be used for directing calls incoming to the customer to alternate telephone number destinations as implementations of "call forwarding" and "follow me" services. Processing component 16, designated "signal transfer point" (STP), oversees the routing of control signals for implementation of services/features such as call forwarding, call blocking, etc. Processing component 17, designated "signal switching point" (SSP), manages details of control signal routing for implementation of the foregoing services/features.

The chart in FIG. 1A indicates how this system is utilized by customers. To establish or cancel a service/feature the customer calls a telephone company ("telco") business office and a company service representative intercedes to respectively establish or cancel the service (block 20). Certain services can be disabled by the customer during any telephone call-out process, by dialing or tone keying a specific prefix code (e.g. "*70" to disable call waiting) prior to dialing the number of the party being called (block 21).

Figure 2:
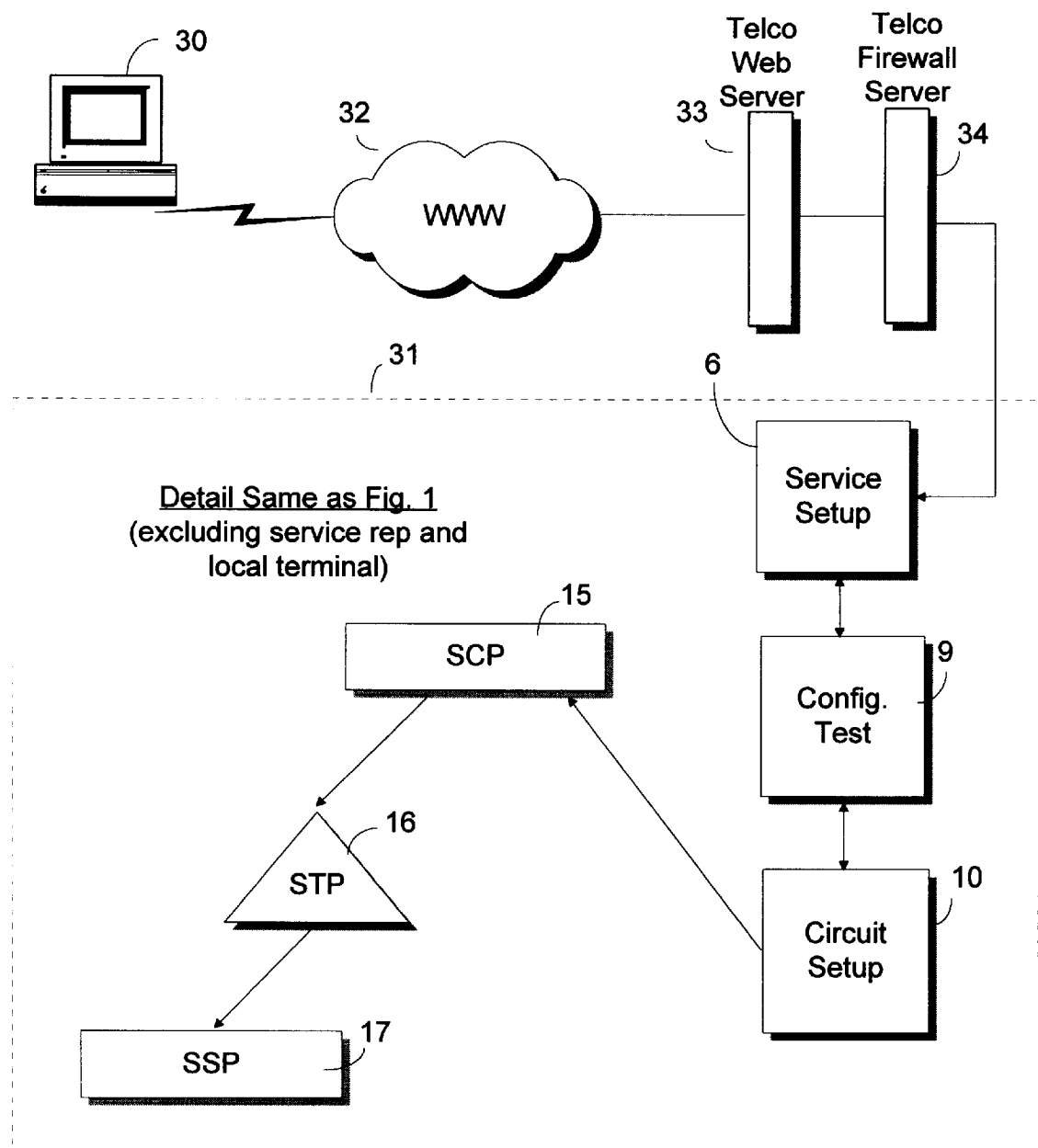
FIG. 2 schematically illustrates how the present invention can be applied to the management infrastructure of FIG. 1.

The block diagram in FIG. 2 shows how the present invention eliminates the need for service representative intercession and allows for a broader range of services and features to be offered to telco customers. In this figure, a computer 30, owned by or available to a telco customer, communicates directly with business office and TAI components of the PSTN shown at 31, through a public data network 32 external to the PSTN (shown here as the world wide web, abbreviated "WWW") and server systems 33 and 34 administered by the PSTN. Server 33 is a data server linking to the external data network, and server 34 is a firewall server interactive with server 33 to protect against accesses to the telco service administering system 31 by unauthorized individuals (individuals other than customers and their designated agents and/or employees).

Elements within (telco) system 31 retain the numbering and functions of corresponding respective elements in FIG. 1; indicating that, in effect, service representative intercession is eliminated and the customer (or their authorized agent or representative) operates through a computer and the external network interface 32–34 to implement desired changes in services and/or features. Preferably, the customer computer 30 is equipped with a conventional web browser compatible with a widely used script language (e.g. a browser such as Netscape's Navigator[1] which is compatible with a script language such as the Java[2] language provided by Sun Microsystems), and the (telco) web server is equipped to provide display "forms" to the customer which guide the customer through whatever process is required for setting up and instituting services and features, while guarding against possible actions by customers that could be detrimental to PSTN operations.

[1]Trademark of Netscape Corporation
[2]Trademark of Sun Microsystems Company

The chart in FIG. 2A shows how the customer uses the arrangement of FIG. 2. To add, delete and modify services/features, the customer interacts directly with the telco local business offices and telco TAI facilities (block 36). This interaction is unrelated to the state of the customer telephone line that is affected by such action (block 37); i.e. that line could be idle or in use on a telephone call, the latter provided that the link between the customer's computer and the web does not require use of the same telephone line).

Figure 3:
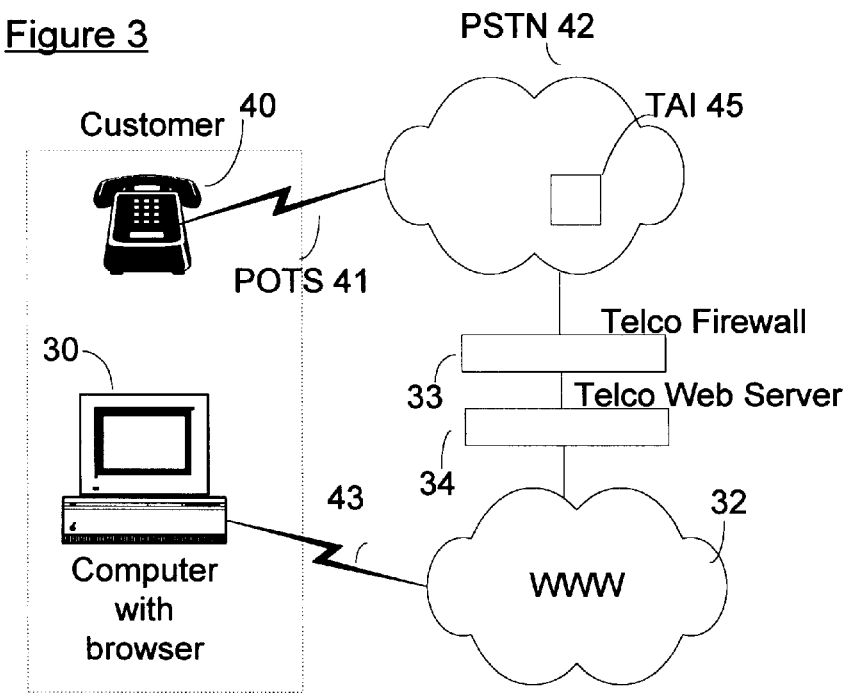
FIG. 3 schematically illustrates how customer telephone and computer equipment interface to the PSTN system of FIG. 2.

FIG. 3 shows how the customer's computer and telephone equipment are configured for operation in the environment of FIG. 2. The customer's telephone 40 operates through a link 41 to "plain old telephone system" (POTS) lines to conduct telephone call activity through the PSTN shown at 42, while the customer's computer 30 operates through a link 43 to the web 32, and telco servers 33 and 34. Telephony application intelligence (TAI) of the PSTN, shown at 45, remains conventionally accessible to the customer's telephone link for supporting e.g. pre-dialed disabling of functions such as call waiting, and is newly accessible to servers 33 and 34 for implementing services requested through the customer's computer 30.

Figure 4:
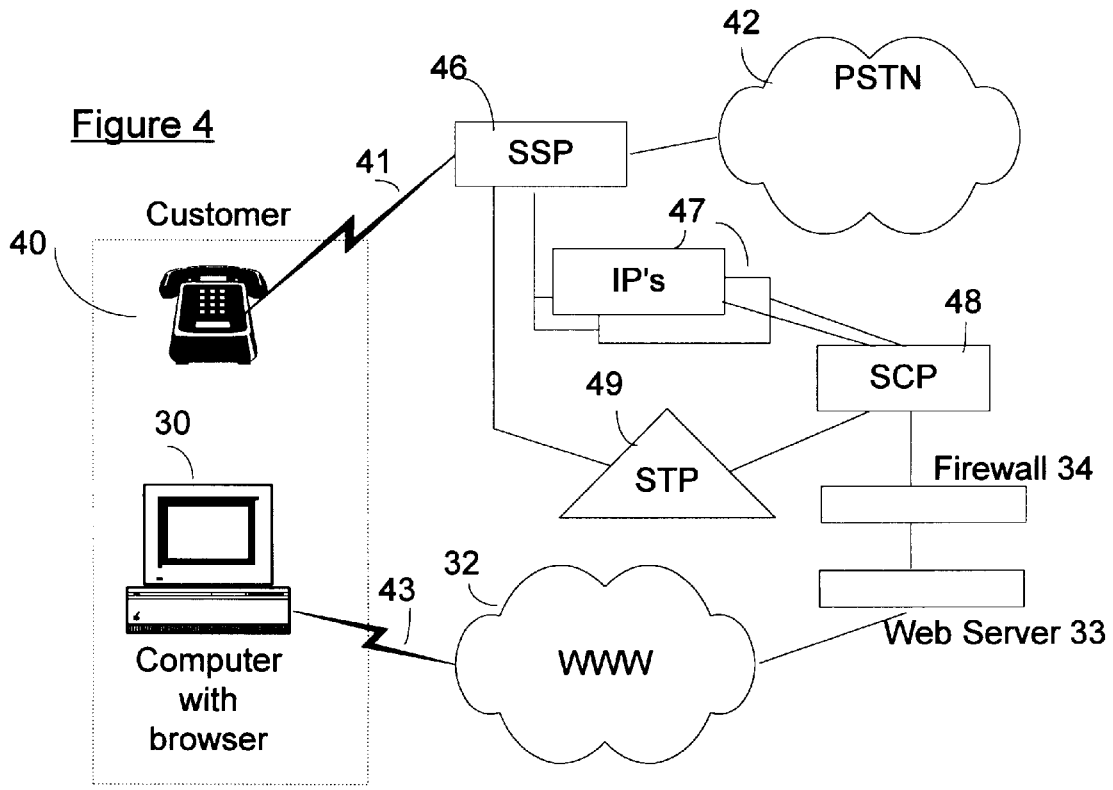
FIG. 4 is similar to FIG. 3, but showing details of internal elements of the PSTN that are not present in FIG. 3.

FIG. 4 elaborates on FIG. 3, by showing that signals between a customer's telephone 40 and the PSTN are routed by cooperative processes of an SSP (service switching point) component of the TAI at 46, and intelligent peripherals (IP's) at 47 that are attached to the SSP; while signals between the customer's computer 30 and the TAI are handled through link 43, web 32, telco servers 33 and 34, and the SCP (service control point) element of the TAI at 48. This figure also shows paths of communication between the SSP and STP (signalling transfer point) at 49, between the SCP and the STP, and between the IP's and the SCP.

The TAI remains constructed in accordance with presently well-known principles of (published) architecture for Advanced Intelligent Network (AIN) systems. SCP elements such as 48 are the primary focal point for service within the network. They contains service logic, and online real-time database systems, enabling them to provide call processing information and instructions for other elements within the AIN hierarchy. SSP elements such as 46 process calls requiring access to remote databases or special logical processing. An SSP sends calling and called numbers, related to a call, to the SCP, and receives instructions from the latter on how to handle the call. STP elements such as 49 provide communication paths from SSP's to SCP's. Intelligent peripherals (IP's) such as 47 are a "standalone" network component providing resources relating to voice termination applications, such as customized announcements and DTMF (dual-tone multifrequency) digit collection, as well as switching infrastructure to connect users to resources. Service logic used to control these IP resources is located in the SCP's.

FIG. 5 shows an alternative to the configuration of FIG. 4 wherein the web server 33 utilizes a database 50 containing a forms based program to conduct its communications relative to browsers on customer computers, and thereby ensure that actions taken by customers are restricted, by limitations of the forms displayed to them, so that such actions can not adversely impact operations of the PSTN. In this figure, server 34 links directly to customer record and customer features databases, 7 and 18 respectively, instead of the SCP (see FIG. 4).

Figure 6:
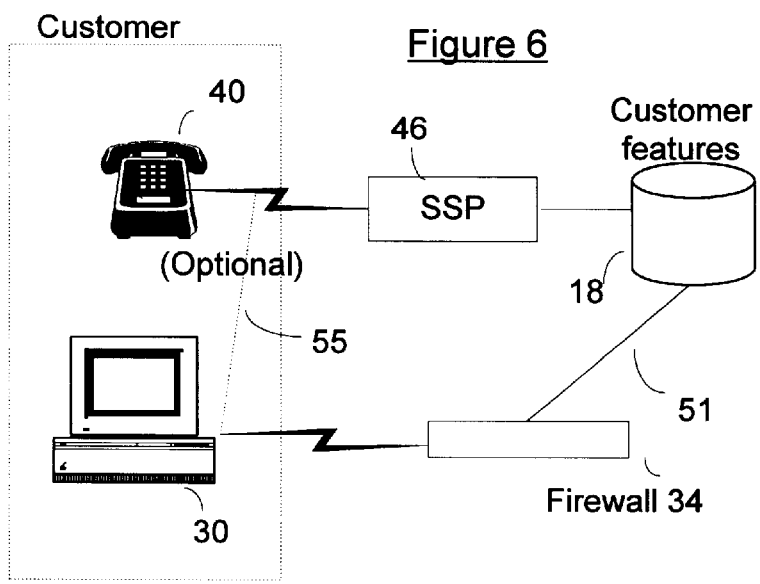
FIG. 6 illustrates an alternative to the arrangements suggested in FIGS. 4 and 5.

FIG. 6 carries the theme of FIG. 5 a step further by interfacing the servers 33 and 34 directly to a customer feature database, potentially eliminating need for direct communication with TAI elements SCP, STP, and SSP, and exposures to system malfunction or impairment that such direct communications may present. As in FIG. 5, access here is provided only to that end user data which customers may need to modify to affect their own services, and therefore such access is incapable of adversely affecting PSTN operations relative to other customers.

Figure 7:
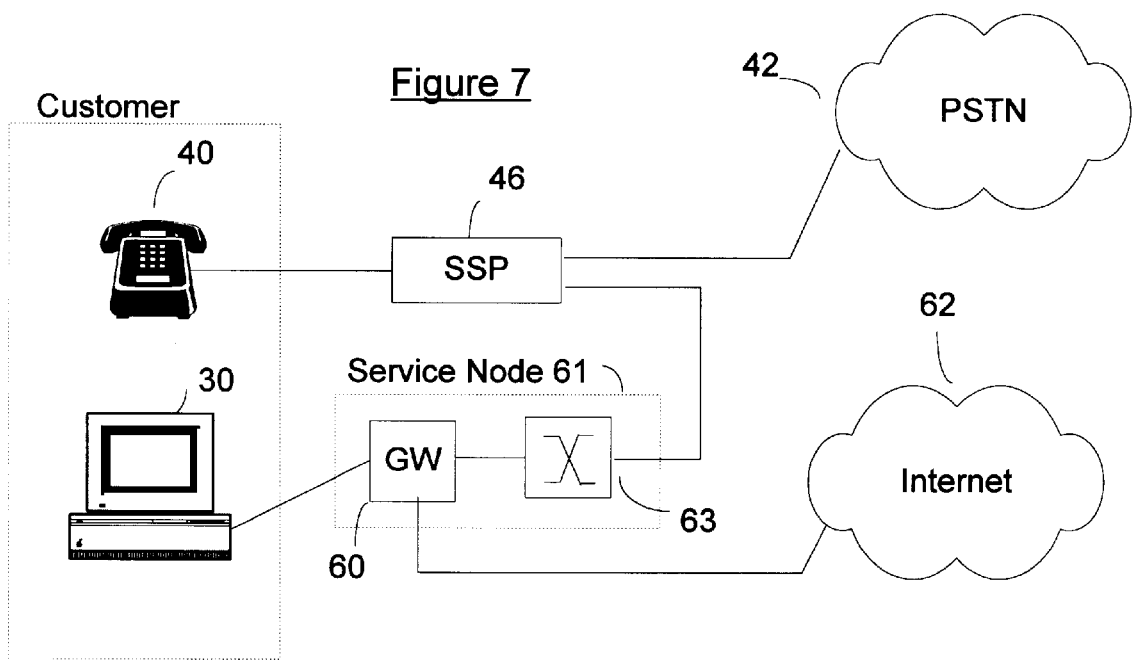
FIG. 7 illustrates an alternative to arrangements suggested in FIGS. 4–6.

FIG. 7 varies this by eliminating the web server of previous figures and linking the customer's computer 30, through a gateway computer 60 within a service node 61 of the PSTN, to the Internet seen at 62. Switch 63 at the service node allows for communications to be directed either between the customer's computer and the Internet, without further telco involvement, or between the same computer and the SSP component of PSTN application intelligence. Services provided wholly by the service node can be modified by customer computers in the same manner as alternatives previously described.

Figure 8:
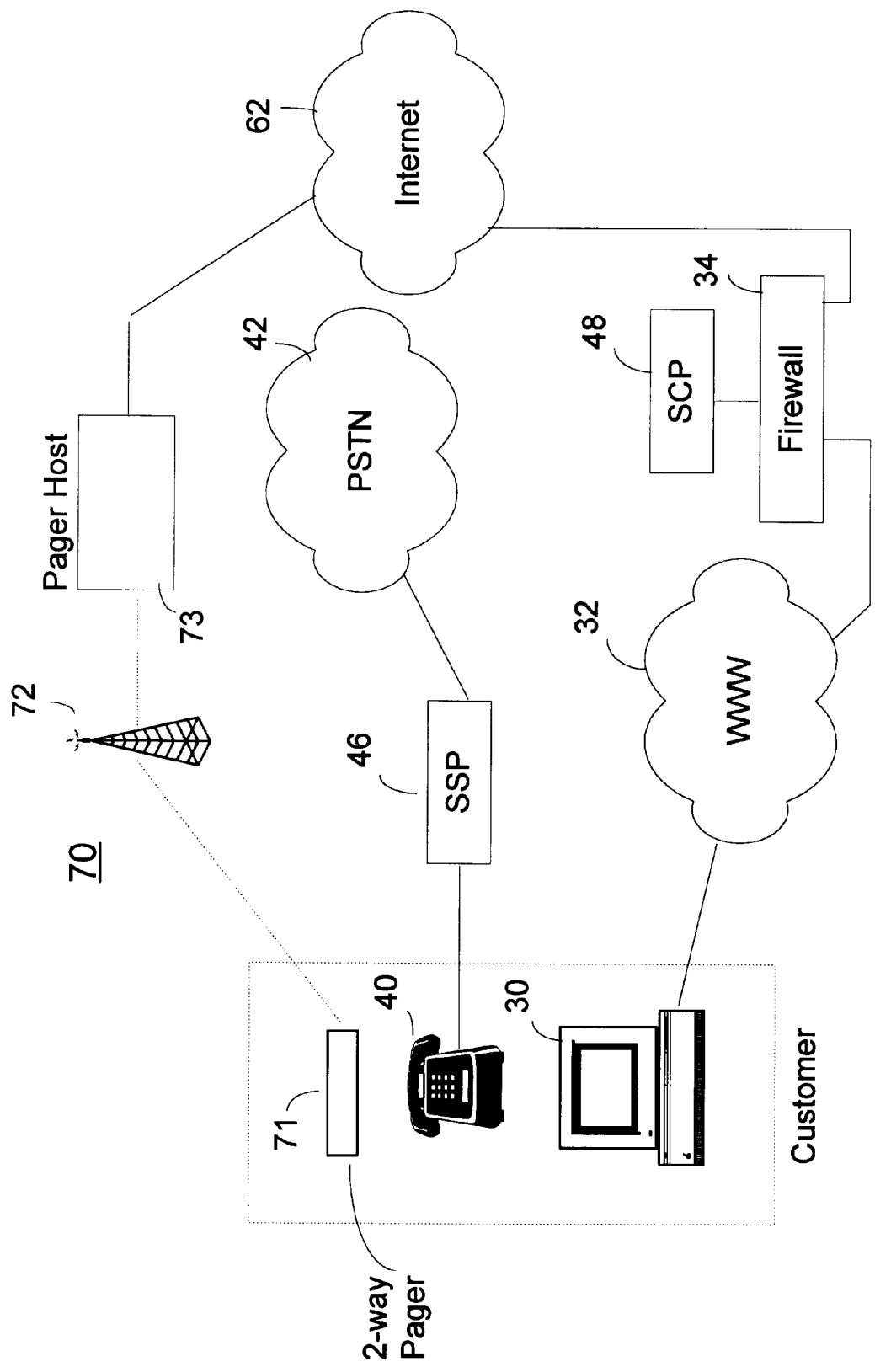
FIG. 8 illustrates a preferred embodiment of the invention exemplifying the diversity of customer equipment and communication methodologies that could be supported.

FIG. 8 shows how the foregoing arrangements can be extended to allow customer equipment other than telephones and computers to participate in processes affecting telephone services. Notably, in this figure, a paging network 70 links customer 2-way pagers such as 71 to the Internet 62, and via the latter and telco firewall 34 to SCP element 48. The SCP interfaces to other TAI elements (see FIG. 4). Paging network 70 comprises a radio relay link 72 and pager host station 73, the latter linking to the Internet.

Figure 9:
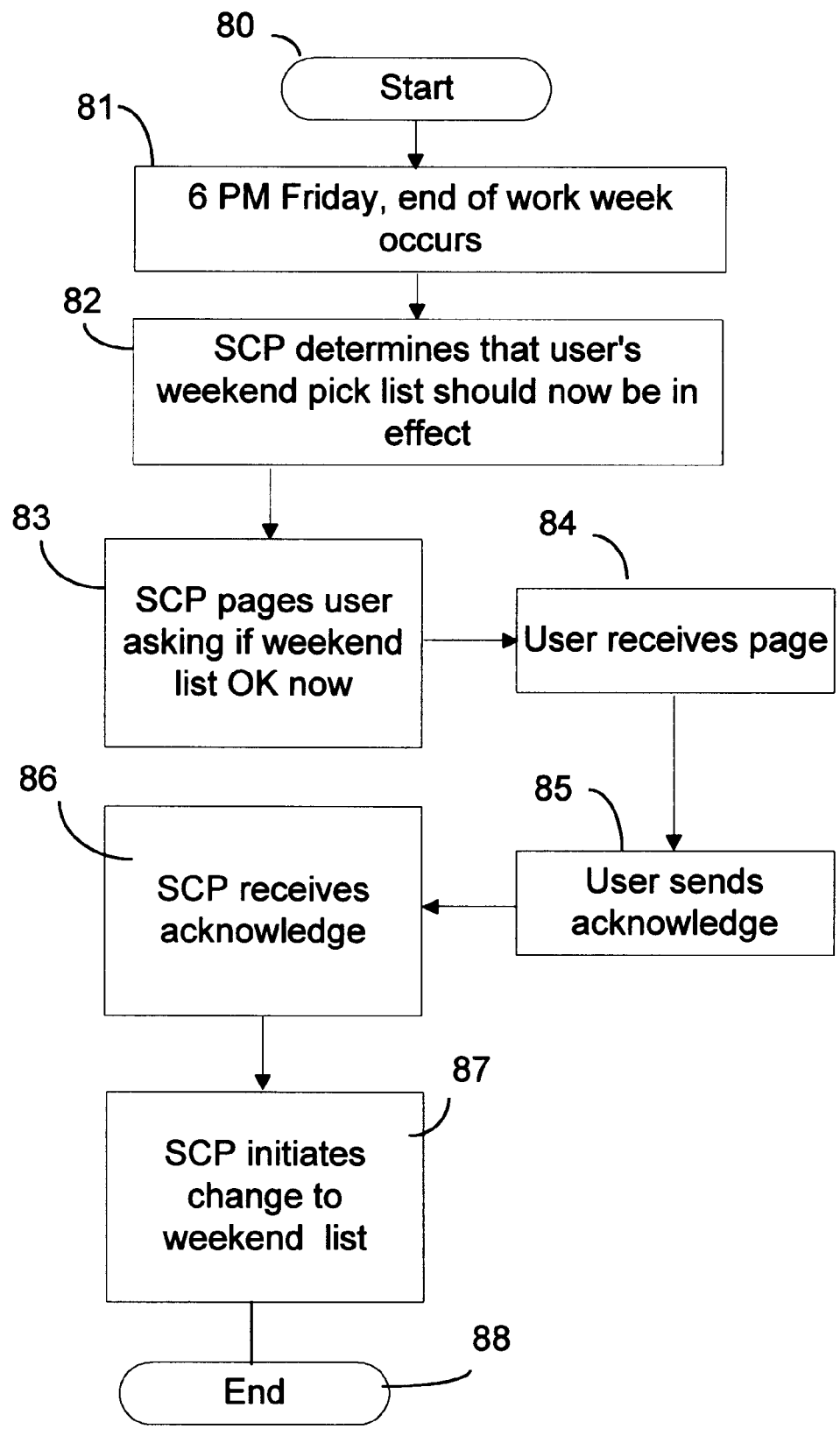

Charts in FIGS. 9 and 10 show how the paging network could be used by telco customers to select "follow me" pick lists for transferring calls to various different telephones of a customer during different parts of a week. The chart in FIG. 10 shows how the customer installs pick lists for such usage, and the chart in FIG. 9 shows how the customer pager is used to make selections. The chart in FIG. 9 is described first here, although the process shown therein requires prior installation of pick lists by the customer.

Starting at 80, an SCP intelligence element of the PSTN detects the end of a work week and beginning of a weekend (block 81), and recognizes from this that a given customer's/user's "weekend pick list" should now be in effect for routing telephone calls to that customer (block 82). Pick lists including a weekend pick list are supplied by the customer to the SCP when the follow me service is selected by that customer. Each list contains one or more telephone numbers to which telephone calls to the customer's office telephone are to be routed if the office telephone is not answered.

Based on this, and an additional determination that the respective customer is reachable through a pager network such as 70 (FIG. 8) the SCP intelligence routes a page message to the respective customer's pager inquiring if the current weekend pick list should now be in effect for the respective customer (block 83). This message is routed via the Internet and the pager network (e.g. 70 FIG. 8) to the respective customer's pager (e.g. 71 FIG. 8), alerting the customer (e.g. via a "beep") to look at the pager's display (block 84). A user/customer receiving this pager message (block 84) merely operates the respective 2-way pager unit to return an acknowledgement signal (block 85) if use of the respective weekend list is suitable.

Upon receipt of this acknowledgement (block 86), the SCP acts to initiate appropriate changes to the customer's feature records to install the weekend list as the currently effective one (block 87) and that completes the process (block 88).

The chart in FIG. 10 shows how pick lists are installed by a customer (or an authorized user of the customer's telephone line). Starting at 100, the customer/user connects to the world wide web, and accesses a page or pages therein, at a location defined by an associated URL (uniform resource locator), which page(s) contain(s) forms that can be modified by the customer to install desired pick lists. At 102–104, an update service application, in the web server receiving the URL request, demands and receives password information to ensure that the requesting user is the customer or an authorized agent of the customer. At 105–107 the customer/user fills in the forms offered by the update service, detailing "follow me" phone numbers that the user wishes to have in force at various times. At 108–109 the user disconnects from the web, while at 110–111 the update service performs functions needed to have the user's numbers accepted and stored in the SCP database of the PSTN.

The foregoing and other features and aspects of the invention will be further understood from the following claims.

Accordingly, we claim:

1. A telephone service management facility for enabling the public switched telephone network (PSTN) to provide improved telephony services to its customers comprising:

first means interfacing between the PSTN and a communication network external to said PSTN for conducting communications between the PSTN and its customers via equipment other than telephones; said communications allowing said customers to inter-act directly with data processing systems internal to said PSTN, which systems can control delivery of telephone system services to said customers, to enable said customers to instantly vary real-time telephone system services to which respective customers are subscribed; and second means interfacing between said first means and the PSTN for conducting a security check on communications received from said equipment other than telephones for determining if said communications originate from a PSTN customer entitled to engage in said direct communication with said internal processing systems, or from a duly authorized agent of a PSTN customer so entitled; said second means allowing communications from said equipment other than telephones to affect a said telephone system service delivered to a customer associated with said equipment other than telephones if and only if a prior determination has been made that respective communications are from one of the customer receiving the respective service and authorized agents of that customer.

2. A facility in accordance with claim 1 wherein said external network is a data communications network, said first means comprises a data server linked to computers used by said PSTN customers via said external network, and said second means comprises a firewall server operative between said data server and elements of said PSTN responsible for automatically administering telephone services within said PSTN.

3. A facility in accordance with claim 2 wherein said data network is one of: the Internet and the World Wide Web, and said data server is a computer configured to communicate with browser software installed in said computers used by said customers.

4. A telephone service management facility for enabling the public switched telephone network (PSTN) to provide improved telephony services to its customers comprising:

first means interfacing between the PSTN and a communication network external to said PSTN for conducting communications between the PSTN and its customers via equipment other than telephones;

second means interfacing between said first means and the PSTN for conducting a security check on communications received from said equipment other than telephones for determining if said communications originate from a PSTN customer or a duly authorized agent of a PSTN customer; said second means allowing communications from said equipment other than telephones to affect a telephone service delivered to a customer associated with said equipment other than telephones if and only if a prior determination has been made that respective communications are from one of the customer receiving the respective service and authorized agents of that customer; and wherein said external network is a data communications network, said first means comprises a data server linked to computers used by said PSTN customers via said external network, and said second means comprises a firewall server operative between said data server and elements of said PSTN responsible for automatically administering telephone services within said PSTN; and wherein said data server operates to communicate with said customer computers using forms-based software that is configured to limit actions which customers can evoke relative to said sensitive internal elements of the PSTN.

5. A facility in accordance with claim 1 wherein said external communication network is at least one of a group of public communication networks; said group consisting of the Internet, the World Wide Web, and at least one radio-based pager network supporting communications between the PSTN and customers thereof having use of two-way pager devices.

6. A telephone service management facility for enabling the public switched telephone network (PSTN) to provide improved telephony services to its customers comprising:

first means interfacing between the PSTN and a communication network external to said PSTN for conducting communications between the PSTN and its customers via equipment other than telephones; and second means interfacing between said first means and the PSTN for conducting a security check on communications received from said equipment other than telephones for determining if said communications originate from a PSTN customer or a duly authorized agent of a PSTN customer; said second means allowing communications from said equipment other than telephones to affect a telephone service delivered to a customer associated with said equipment other than telephones if and only if a prior determination has been made that respective communications are from one of the customer receiving the respective service and authorized agents of that customer; and wherein services provided by the PSTN to its customers are administered by a hierarchical network of telephony application intelligence (TAI) within said PSTN, said TAI network comprising a plurality of separate access points; and wherein said first and second means are adapted for interfacing said customers directly, without intervention of human representatives of the PSTN, to a predetermined one of said TAI network access points.

7. A facility in accordance with claim 6 wherein said access points of said TAI network comprise a service control point (SCP), a signal transfer point (STP), and a signal switching point (SSP).

8. A facility A telephone service management facility for enabling the public switched telephone network (PSTN) to provide improved telephony services to its customers comprising:

first means interfacing between the PSTN and a communication network external to said PSTN for conducting communications between the PSTN and its customers via equipment other than telephones; and second means interfacing between said first means and the PSTN for conducting a security check on communications received from said equipment other than telephones for determining if said communications originate from a PSTN customer or a duly authorized agent of a PSTN customer; said second means allowing communications from said equipment other than telephones to affect a telephone service delivered to a customer associated with said equipment other than telephones if and only if a prior determination has been made that respective communications are from one of the customer receiving the respective service and authorized agents of that customer; and wherein said PSTN comprises a hierarchical network of telephony application intelligence (TAI) responsible for administering said customer services, said TAI network comprising a plurality of predetermined access points; and wherein said first and second means are connected to databases used by said TAI network, but without direct connection to said control points and without required assistance of human representatives of said PSTN.

* * * * *